United States Patent
Walls et al.

(10) Patent No.: US 11,288,870 B2
(45) Date of Patent: Mar. 29, 2022

(54) METHODS FOR GUIDING A USER WHEN PERFORMING A THREE DIMENSIONAL SCAN AND RELATED MOBILE DEVICES AND COMPUTER PROGRAM PRODUCTS

(71) Applicant: SONY GROUP CORPORATION, Tokyo (JP)

(72) Inventors: Mattias Walls, Häljarp (SE); Francesco Michielin, Stuttgart (DE); Henrick Tuszynski, Lomma (SE); Johannes Elg, Helsingborg (SE); Fredrik Olofsson, Lund (SE); Lars Novak, Bjärred (SE)

(73) Assignee: SONY GROUP CORPORATION, Tokyo (JP)

( * ) Notice: Subject to any disclaimer, the term of this patent is extended or adjusted under 35 U.S.C. 154(b) by 83 days.

(21) Appl. No.: 16/643,070

(22) PCT Filed: Aug. 31, 2017

(86) PCT No.: PCT/US2017/049520
§ 371 (c)(1),
(2) Date: Feb. 28, 2020

(87) PCT Pub. No.: WO2019/045713
PCT Pub. Date: Mar. 7, 2019

(65) Prior Publication Data
US 2020/0334909 A1    Oct. 22, 2020

(51) Int. Cl.
*G06T 19/00* (2011.01)
*G06T 17/10* (2006.01)

(52) U.S. Cl.
CPC ............ *G06T 19/006* (2013.01); *G06T 17/10* (2013.01)

(58) Field of Classification Search
None
See application file for complete search history.

(56) References Cited

U.S. PATENT DOCUMENTS

| 2003/0066949 A1 | 4/2003 | Mueller et al. |
| 2005/0089214 A1 | 4/2005 | Rubbert et al. |
| 2013/0181983 A1 | 7/2013 | Kitamura et al. |

(Continued)

FOREIGN PATENT DOCUMENTS

| EP | 2680594 | 1/2014 |

OTHER PUBLICATIONS

PCT International Search Report and PCT Written Opinion of the International Searching Authority, dated Jan. 11, 2018, for corresponding PCT International Application No. PCT/US2017/049520.

(Continued)

*Primary Examiner* — Robert J Craddock
(74) *Attorney, Agent, or Firm* — Myers Bigel, P.A.

(57) ABSTRACT

A method of guiding a user when performing a three-dimensional scan of an object includes determining two-dimensional feature points from two-dimensional captured images of the object, determining three-dimensional coordinates for the two-dimensional feature points, determining a cut plane based on the three-dimensional coordinates that divides the object into a target portion and a cut-away portion, and displaying the target portion of the object on a display using a first indicium and the cut-away portion of the object on the display using a second indicium that is different from the first indicium.

20 Claims, 9 Drawing Sheets

(56) References Cited

U.S. PATENT DOCUMENTS

2015/0009214 A1     1/2015   Lee et al.
2016/0284123 A1     9/2016   Hare et al.

OTHER PUBLICATIONS

Anonymous: "FlexScan3D User Manual", Dec. 31, 2015 (Dec. 31, 2015), pp. 1-178, XP055423244, Retrieved from the Internet: URL:http://www.tut.fi/cs/groups/public_news/@l102/@web/@p/documents/liit/x225803.pdf [retrieved on Nov. 9, 2017] Chapter: Introduction; p. 12, Chapter: Calibration Overview; p. 27-p. 28, chapters: Scanner volume and area & Placing Reference Targets; p. 62, Chapter: Setting Scanning Volume; p. 67, Chapter: Setting a Cut Plane; p. 68.

METHODS FOR GUIDING A USER WHEN PERFORMING A THREE DIMENSIONAL SCAN AND RELATED MOBILE DEVICES AND COMPUTER PROGRAM PRODUCTS

CROSS REFERENCE TO RELATED APPLICATION

This application is a 35 U.S.C. § 371 national stage application of PCT International Application No. PCT/US2017/049520, filed on Aug. 31, 2017, the content of which is incorporated herein by reference in its entirety. The above-referenced PCT International Application was published in the English language as International Publication No. WO 2019/045713 A1 on Mar. 7, 2019.

BACKGROUND

The present disclosure relates to image processing and, in particular, to three-dimensional (3D) image scanning.

A three-dimensional (3D) model of an object may be generated through a 3D scanning process in which a user uses a mobile device, such as a mobile phone, equipped with a camera and a display. The camera is used to capture multiple images, which may be two-dimensional (2D) in the case of a mono camera and stereo images in the case of a stereo camera. Various methods may be used to calculate and track the movements of the camera in relation to the scanned object and ultimately construct a 3D model of the scanned object. It may not always be desired, however, to create, a full 360 degree 3D model of a scanned object or a full 3D model of the entire object. For example, for some purposes, only a portion of a scanned object, such as the face or head of a person, is of interest with the rest of the 3D reproduction being unused. Scanning more than what is desired may not only slow down the scanning process until the entire object is scanned, but may also reduce the quality of the scan as the risk that the object moves or environment changes may increase in conjunction with the increase in scanning time. Moreover, mobile devices may have limited computational and storage capabilities and processing extraneous image data to construct a 3D model therefrom may strain the computing and storage capabilities of such devices.

SUMMARY

Embodiments of the inventive subject matter may provide a user with real-time guidance when performing a scanning operation to focus the scanning operation on an object or parts of an object that are desired for a 3D reproduction model while avoiding scanning areas that are unwanted or unneeded. Further embodiments of the inventive subject matter may provide a real-time qualitative evaluation of the scanned object that may be used to provide the user feedback with respect to which target areas need more scanning data to improve the ultimate 3D reproduction model and which areas have been sufficiently scanned.

In some embodiments of the inventive subject matter, a method of guiding a user when performing a three-dimensional scan of an object comprises determining two-dimensional feature points from two-dimensional captured images of the object, determining three-dimensional coordinates for the two-dimensional feature points, determining a cut plane based on the three-dimensional coordinates that divides the object into a target portion and a cut-away portion, and displaying the target portion of the object on a display using a first indicium and the cut-away portion of the object on the display using a second indicium that is different from the first indicium.

In other embodiments, determining the three-dimensional coordinates for the two-dimensional feature points comprises determining the three-dimensional coordinates for the two-dimensional feature points using a Simultaneous Localization and Mapping (SLAM) method.

In still other embodiments, the method, further comprises receiving input from the user selecting use of the cut-plane for the three-dimensional scan.

In still other embodiments, the object is a person and the target portion is a face of the person.

In still other embodiments, the object is a person and the target portion is an entire head of the person.

In still other embodiments, the object comprises a subject, and a support structure, the subject being supported by the support structure.

In still other embodiments, the target portion is the subject.

In still other embodiments, the first indicium is a first color and the second indicium is a second color that is different from the first color.

In still other embodiments, the first indicium and the second indicium are audible indicia.

In still other embodiments, the first indicium and the second indicium are touch indicia.

In further embodiments of the inventive subject matter, a method of guiding a user when performing a three-dimensional scan of an object comprises determining two-dimensional feature points from two-dimensional captured images of the object, associating a plurality of indicia with a plurality of two-dimensional feature point quality levels; evaluating a quality of the two-dimensional feature points that were determined from the two-dimensional captured images of the object, and displaying the object on the display using one or more of the plurality of indicia associated with the plurality of two-dimensional feature point quality levels based on the quality of the two-dimensional feature points, that was evaluated.

In still further embodiments of the inventive subject, matter, the method further comprise determining three-dimensional coordinates for the two-dimensional feature points. Evaluating the quality of the two-dimensional feature points comprises determining a precision of the three-dimensional coordinates based, on a statistical uncertainty measurement between previously determined ones of the three-dimensional coordinates and subsequently determined ones of the three-dimensional coordinates.

In still further embodiments of the inventive subject matter, the statistical uncertainty measurement is a standard deviation determination.

In still further embodiments of the inventive subject matter, the method, further comprises determining three-dimensional coordinates for the two-dimensional feature points. Evaluating the quality of the two-dimensional feature points comprises determining how much the three-dimensional coordinates have changed between previously determined ones of the three-dimensional coordinates and subsequently determined ones of the three-dimensional coordinates.

In still further embodiments of the inventive subject matter, the method further comprises determining three-dimensional coordinates for the two-dimensional feature points. Evaluating the quality of the two-dimensional feature points comprises determining when the object moves during performing of the three-dimensional scan.

In still further embodiments of the inventive subject matter, the method further comprises determining three-dimensional coordinates for the two-dimensional feature points. Evaluating the quality of the two-dimensional feature points comprises determining a density of polygons formed from the three-dimensional coordinates in areas corresponding to at least a portion of the object.

In still further embodiments of the inventive subject matter, the method further comprises determining three-dimensional coordinates for the two-dimensional feature points. Evaluating the quality of the two-dimensional feature points comprises determining pose information for a camera used to capture the two-dimensional images of the object.

In other embodiments of the inventive subject matter, a mobile device including a user interface for guiding a user when performing a three-dimensional scan of an object comprises a display, a processor, and a computer readable storage medium comprising computer readable program code that when executed by the processor causes the processor to perform operations comprising: determining two-dimensional feature points from two-dimensional captured images of the object, determining three-dimensional coordinates for the two-dimensional feature points, determining a cut plane based on the three-dimensional coordinates that divides the object into a target portion and a cut-away portion, and displaying the target portion of the object on the display using a first indicium and the cut-away portion of the object on the display using a second indicium that is different from the first indicium.

In still other embodiments, the first indicium is a first color and the second indicium is a second color that is different from the first color.

In still other embodiments, the first indicium and the second indicium are audible indicia.

In still other embodiments, the first indicium and the second indicium are touch indicia.

In further embodiments of the inventive subject matter, a mobile device including a user interface for guiding a user when performing a three-dimensional scan of an object comprises a display, a processor, and a computer readable storage medium comprising computer readable program code that when executed by the processor causes the processor to perform operations comprising: determining two-dimensional feature points from two-dimensional captured images of the object, associating a plurality of indicia with a plurality of two-dimensional feature point quality levels, evaluating a quality of the two-dimensional feature points that were determined from the two-dimensional captured images of the object, and displaying the object on the display using one or more of the plurality of indicia associated with the plurality of two-dimensional feature point quality levels based on the quality of the two-dimensional-feature points that was evaluated.

In still further embodiments, the operations further comprise determining three-dimensional coordinates for the two-dimensional feature points. Evaluating the quality of the two-dimensional feature points comprises determining a precision of the three-dimensional coordinates based on a statistical uncertainty measurement between previously determined ones of the three-dimensional coordinates and subsequently determined ones of the three-dimensional coordinates.

In still further embodiments, the operations farther comprise determining three-dimensional coordinates for the two-dimensional feature points. Evaluating the quality of the two-dimensional feature points comprises determining how much the three-dimensional coordinates have changed between previously determined ones of the three-dimensional coordinates and subsequently determined ones of the three-dimensional coordinates.

In still further embodiments, the operations further comprise determining three-dimensional coordinates for the two-dimensional feature points, Evaluating the quality of the two-dimensional feature points comprises determining when the object moves during performing of the three-dimensional scan.

In still further embodiments, the operations further comprise determining three-dimensional coordinates for the two-dimensional feature points. Evaluating the quality of the two-dimensional feature points comprises determining a density of polygons formed from the three-dimensional coordinates in areas corresponding to at least a portion of the object.

In still further embodiments, the mobile device further comprises a camera. The operations further comprise determining three-dimensional coordinates for the two-dimensional feature points. Evaluating the quality of the two-dimensional feature points comprises determining pose it for a camera used to capture the two-dimensional images of the object.

In other embodiments of the inventive subject matter, a computer program product that provides a user interface for guiding a user when performing a three-dimensional scan of an object comprises a tangible computer readable storage medium comprising computer readable program code embodied in the medium that is executable by a processor to perform operations comprising: determining two-dimensional feature points from two-dimensional captured images of the object, determining three-dimensional coordinates for the two-dimensional feature points, determining a cut plane based on the three-dimensional coordinates that divides the object into a target portion and a cut-away portion, and displaying the target portion of the object on a display using a first indicium and the cut-away portion of the object on the display using a second indicium that is different from the first indicium.

In still other embodiments, the first indicium is a first color and the second indicium is a second color that is different from the first color.

In still other embodiments, the first indicium and the second indicium are audible indicia.

In still other embodiments, the first indicium and the second indicium are touch indicia.

In further embodiments of the inventive subject matter, a computer program product that provides a user interface for guiding a user when performing a three-dimensional scan of an object comprises a tangible computer readable storage medium comprising computer readable program code embodied in the medium that is executable by a processor to perform operations comprising determining two-dimensional feature points from two-dimensional captured images of the object, associating a plurality of indicia with a plurality of two-dimensional feature point quality levels, evaluating a quality of the two-dimensional feature points that were determined from the two-dimensional captured images of the object, and displaying the object on the display using one or more of the plurality of indicia associated with the plurality of two-dimensional feature point quality levels based on the quality of the two-dimensional feature points that was evaluated.

In still further embodiments, the operations further comprise determining three-dimensional coordinates for the two-dimensional feature points. Evaluating the quality of the two-dimensional feature points comprises determining a precision of the three-dimensional coordinates based on a statistical uncertainty measurement between previously determined ones of the three-dimensional coordinates and subsequently determined ones of the three-dimensional coordinates.

In still further embodiments, the operations further comprise determining three-dimensional coordinates for the two-dimensional feature points. Evaluating the quality of the two-dimensional feature points comprises determining how much the three-dimensional coordinates have changed between previously determined ones of the three-dimensional coordinates and subsequently determined ones of the three-dimensional coordinates.

In still further embodiments, the operations further comprise determining three-dimensional coordinates for the two-dimensional feature points. Evaluating the quality of the two-dimensional feature points comprises determining when the object moves during performing of the three-dimensional scan.

In still further embodiments, the operations further comprise determining three-dimensional coordinates for the two-dimensional feature points. Evaluating the quality of the two-dimensional feature points comprises determining a density of polygons formed from the three-dimensional coordinates in areas corresponding to at least a portion of the object.

In still further embodiments, the operations further comprise determining three-dimensional coordinates for the two-dimensional feature points. Evaluating the quality of the two-dimensional feature points comprises determining pose information for a camera used to capture the two-dimensional images of the object.

Other methods, systems, devices, articles of manufacture, and/or computer program products according to embodiments of the inventive subject matter will be or become apparent to one with skill in the art upon review of the following drawings and detailed description. It is intended that all such additional systems, methods, articles of manufacture, and/or computer program products be included within this description, be within the scope of the present inventive subject matter, and be protected by the accompanying claims. Moreover, it is intended that all embodiments disclosed herein can be implemented separately or combined in any way and/or combination.

BRIEF DESCRIPTION OF THE DRAWINGS

Other features of embodiments will be more readily understood from the following detailed description of specific embodiments thereof when read in conjunction with the accompanying drawings, in which.

DETAILED DESCRIPTION

Figure 1A:
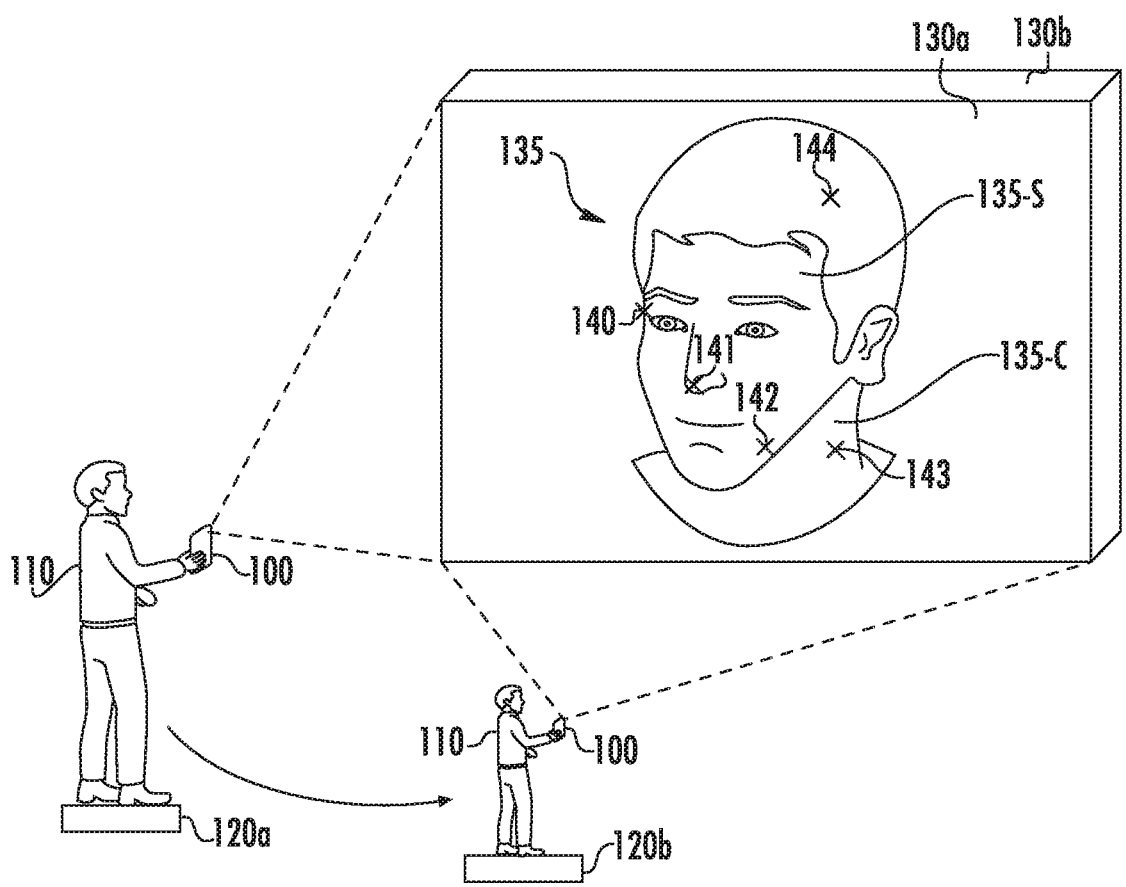
FIG. 1A is a diagram illustrating a perspective view of a three-dimensional (3D) scanning operation in accordance with some embodiments of the inventive subject matter.

In the following detailed description, numerous specific details are set forth in order to provide a thorough understanding of embodiments of the present disclosure. However, it will be understood by those skilled in the art that the present invention may be practiced without these specific details, in other instances, well-known methods, procedures, components and circuits have not been described in detail so as not to obscure the present invention. It is intended that all embodiments disclosed herein can be implemented separately or combined in any way and/or combination.

As used herein, the term "data processing facility" includes, but it not limited to, a hardware element, firmware component, and/or software component. A data processing system may be configured with one or more data processing facilities.

As used herein, the term "real time" means the performing of an operation without the insertion of any scheduled or artificial delay.

As used herein, the term "mobile terminal" or "mobile device" may include a satellite or cellular radiotelephone with or without a multi-line display; a Personal Communications System (PCS) terminal that may combine a cellular radiotelephone with data processing, facsimile and data communications capabilities; a PDA or smart phone that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals or mobile devices may also be referred to as "pervasive computing" devices.

For purposes of illustration, embodiments of the present invention are described herein in the context of a mobile terminal or mobile device, it will be understood, however, that the present invention is not limited to such embodiments and may be embodied generally as an electronic device that is equipped with a display and is configured to perform a scanning operation of an object for constructing a 3D model of the object.

Some embodiments of the inventive subject matter stem from a realization that a user performing a scan may only want a single object or portion of a single object from the environment in which the scan is performed. Scanning additional objects, or portions of objects that are not needed or not desired in the final 3D model of the object may slow down the scanning process, reduce scan quality, and/or may strain the computing and/or storage capabilities of the device used to perform the scan. Some embodiments of the inventive subject matter may provide a user with real-time guidance when performing a scanning operation to focus the scanning operation on an object or parts of an object that are desired for a 3D reproduction model while avoiding scanning areas that are unwanted or unneeded.

In some embodiments a cut plane is determined and, used to divide the object into a target portion and a cut-away portion. The object is displayed in real time during the scan using a first indicium to identify the target portion and a second indicium that is different from the first indicium to identify the cut-away portion. In some embodiments, the first and second indicia may be different colors, different shades of the same color, different overlay patterns, or other visual mechanism for distinguishing the target portion from the cut-away portion. The first and second indicia may also be implemented using an audio or feel/touch mechanism to distinguish between the target portion and the cut-away portion. For example, when the user attempts to scan an area in the cut-away region, an audible alert may be provided whereas no audible sound may be provided when the user is scanning in the target portion region. In another embodiment, when the user attempts to scan an area in the cut-away region, the device used to perform the scan may vibrate whereas no vibration may be provided when the user is, scanning in the target portion region. The techniques used to distinguish between the target portion and the cut-away portion may incorporate any one of or any combination of visual, audible, and/or touch/feel indicia in accordance with various embodiments of the inventive subject matter.

Further embodiments of the inventive subject matter may provide a real-time qualitative evaluation of the scanned object that may be used to provide the user feedback with respect to which areas of the scanned object have been scanned sufficiently to render the 3D reproduction model and which areas may benefit from additional scanning data to improve the 3D reproduction model. For example, a plurality of indicia may be associated with a plurality of quality levels so as to allow a scanned object to be displayed with the various indicia thereby providing the user with real time information regarding which areas of the object need further scanning and which areas do not need any further scanning. In some embodiments, the plurality of indicia may correspond to a plurality of colors and/or shades/intensities of colors. For example, as the user scans an object the object may initially be displayed with a red color with the color changing through one or more colors until the object is displayed with a green color, which indicates, sufficient scanning data has been acquired to construct a 3D model of the scanned object.

FIG. 1A is a diagram illustrating a perspective view of a three-dimensional (3D) scanning operation in accordance with some embodiments of the inventive subject matter. In FIG. 1A, the user 110 initiates a photographic session of the object 135, such as a person's face or an automobile, at location 120a. The user 110 may physically move around the object 135 to various locations, such as from the location 120a to a different location 120b. An image 130 of the object 135 is captured at each location. For example, image 130a is captured when the electronic device 100 is at the location 120a, and image 130b is captured when the electronic device 100 moves to the different location 120b. The captured images 130 may each be two-dimensional (2D) images.

The electronic device 100 may provide images 130 at various angles as the user 110 walks around the object 135. For example, the user 110 may capture images 130 around 360 degrees (or, alternatively, at least 180 degrees) of the object 135, After capturing at least two images 130, such as the images 130a and 130b, the images 130 may be processed by a processor 208 (FIG. 2)/340 (FIG. 3) in the electronic device 100, or by a processor external to the electronic device 100, to construct a digital 3D model 150 (FIG. 1B) of the object 135, or to otherwise generate a 313 image. The terms "construct" (or "constructing"), "generate" (or "generating"), and "build" (or "building") may be used interchangeably herein.

In some embodiments, the digital 3D model 150 of the object 135 may model two different portions of the object 135. For example, the digital 3D model 150 may model both an upper portion 151-S that in the example shown in FIG. 1B includes the face and head of a person and a lower portion 151-C that includes the shoulders of a person.

Processing of the images 130 may include identifying feature points 140-144 of the object 135 as captured in the images 130. The feature points 140-144 may include various edges, corners, or other points on a surface of the object 135. The feature points 140-144 may be recognizable locations on the physical object 135 that are tracked in various images 130 of the physical object 135. In some embodiments, constructing a digital 3D model 150 of the object 135 may involve capturing several (e.g., three, four, five, or more) images 130 of the object 135 and identifying tens, hundreds, or thousands of feature points 140-144, Locations (e.g., coordinates) of the feature points 140-144 may be estimated using various modeling/statistical techniques.

Figure 1B:
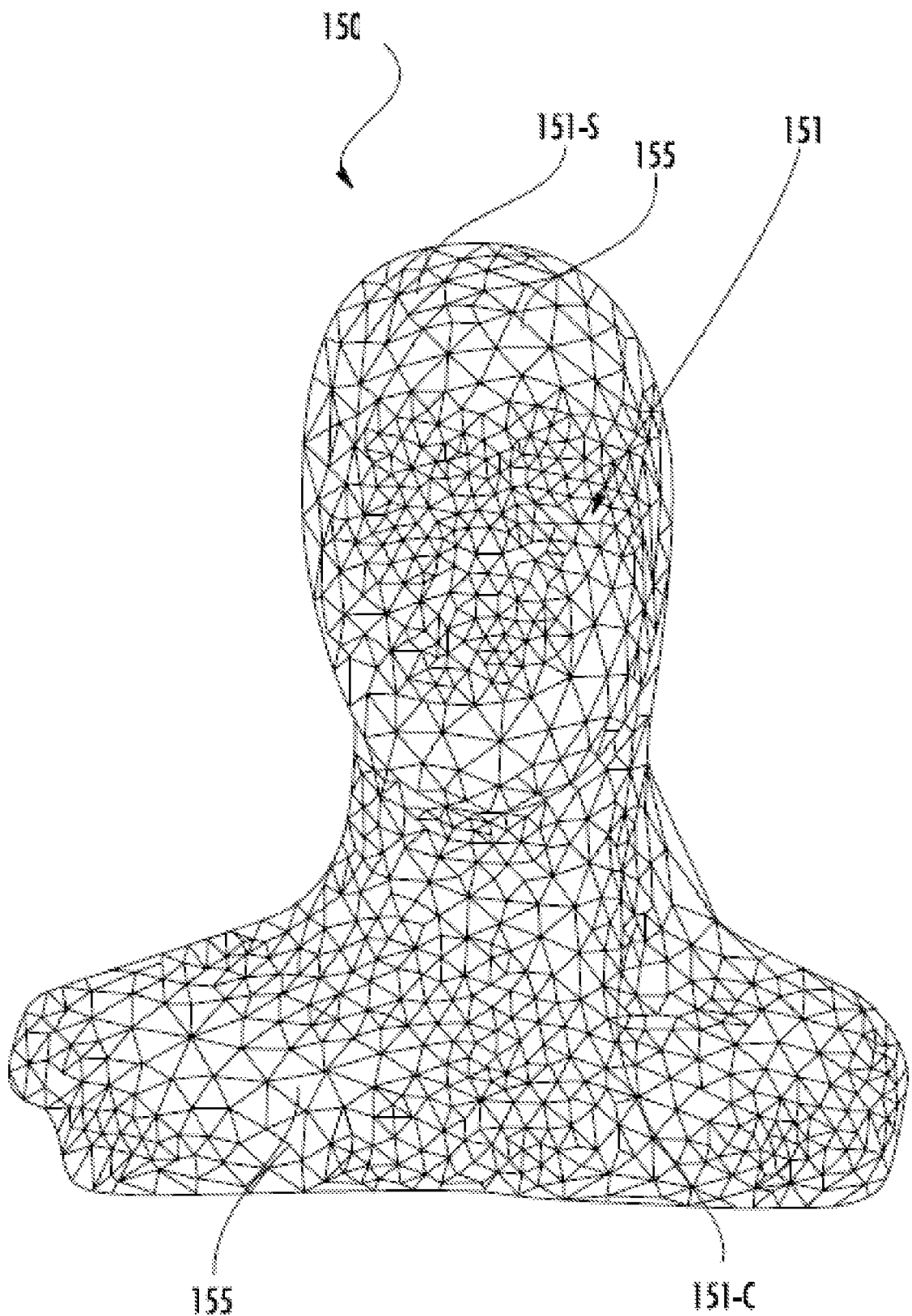
FIG. 1B is a diagram illustrating, a three-dimensional mesh constructed from captured images of an object in accordance with some embodiments of the inventive subject matter.

FIG. 1B is a diagram illustrating a three-dimensional mesh constructed from captured images of an object in accordance with some embodiments of the inventive subject matter. Referring to FIG. 1B, a digital 3D model 150 of the object 135 includes an exterior surface 151 that includes a plurality of polygons 155. The plurality of polygons 155 provides a representation of an exterior surface of the object 135. For example, the plurality of polygons 155 may model features, such as features at the feature points 140-144, on the exterior surface of the object 135. In some embodiments, the plurality of polygons 155 may include a plurality of triangles. Additionally or alternatively, texture (e.g., hair or skin, when the object 135 is a person) may be mapped to the plurality of polygons 155.

The exterior surface 151 of the digital 3D model 150 may include two portions that model two differently-shaped portions, respectively, of the object 135. As an example, the exterior surface 151 of the preliminary digital 3D model 150 may include an upper portion 151-S that models the upper portion 135-S of the object 135 and may further include a lower portion 151-C that models the lower portion 135-C of the object. In the example shown in FIG. 1B, both the upper portion 135-S and the lower portion 135-C of the scanned object may not be needed for the purpose the user has for the 3D model. For example, the user may have scanned a user's face and head for use as an avatar in a video game. In this case, the lower portion 135-C of the 3D model is not needed and may be discarded. As will be described hereinafter, embodiments of the inventive subject matter may provide the user with guidance for scanning only a desired object or portion of an object from the environment to eliminate the additional scanning and processing of captured images for portions of an object or additional structures that are not needed or desired in rendering the 3D model.

Figure 2:
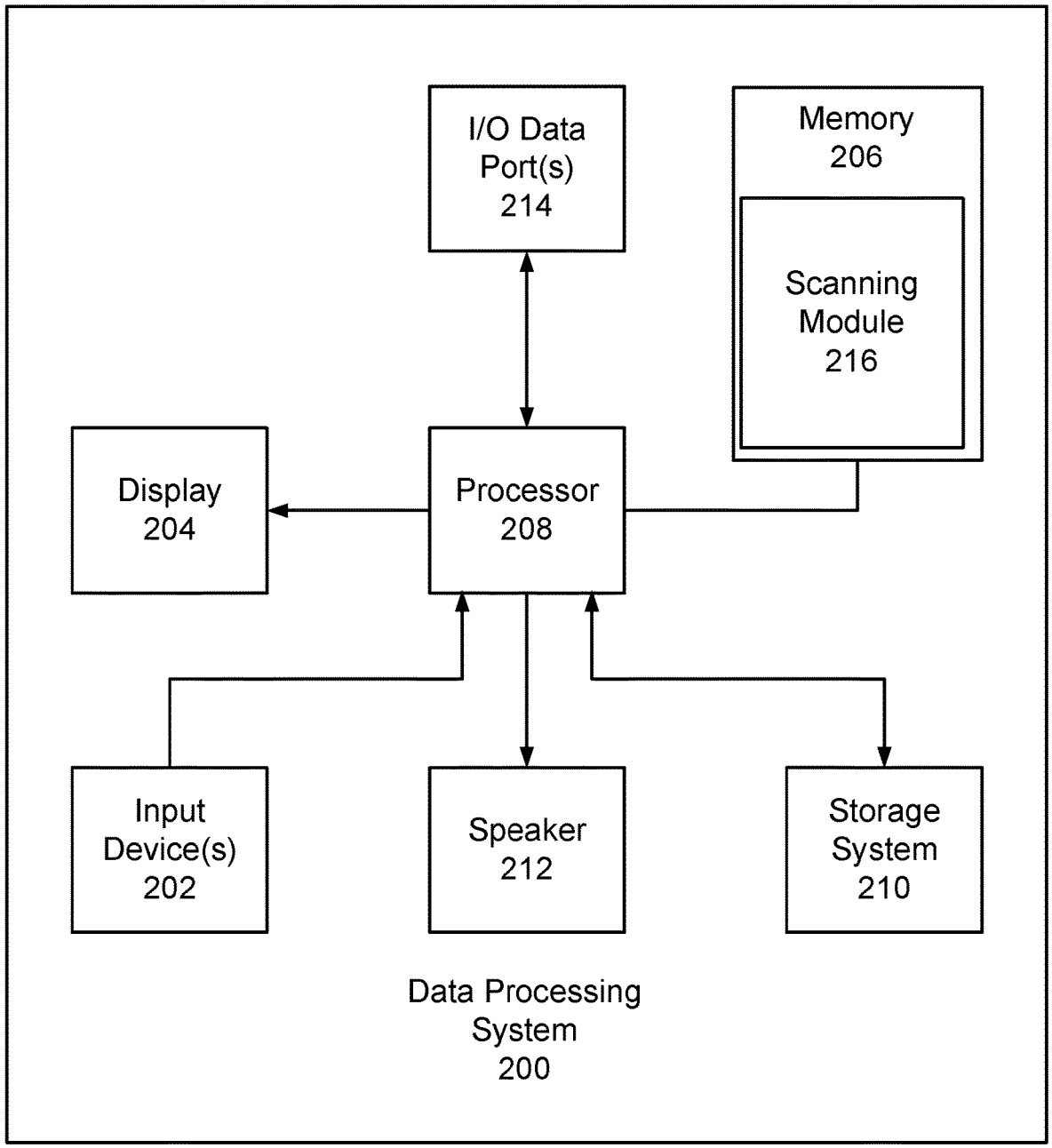
FIG. 2 illustrates a data processing system that may be used to implement a mobile device including a scanning module with a user interface for guiding a user when performing a 3D scan in accordance with some embodiments of the inventive subject matter.

Referring now to FIG. 2, a data processing system 200 that may be used to implement a mobile device including a scanning module with a user interface for guiding a user when performing a 3D scan in accordance with some embodiments of the inventive subject matter comprises input device(s) 202, such as a keyboard or keypad, a display 204, and a memory 206 that communicate with a processor 208. The data processing system 200 may further include a storage system 210, a speaker 212, and an input/output (I/O)

data port(s) 214 that also communicate with the processor 208. The storage system 210 may include removable and/or fixed media, such as floppy disks, ZIP drives, flash drives, USB drives, hard disks, or the like, as well as virtual, storage, such as a RAMDISK or cloud storage. The I/O data port(s) 214 may be used to transfer information between, the data processing system 200 and another computer system or a network (e.g., the Internet). These components may be conventional components, such as those used in many conventional computing devices, and their functionality, with respect to conventional operations, is generally known to those skilled in the art. The memory 206 may be configured with a scanning module 216 that may be configured to perform a 3D scan while providing a user with real time guidance by way of a user interface according to some embodiments of the inventive subject matter.

Figure 3:
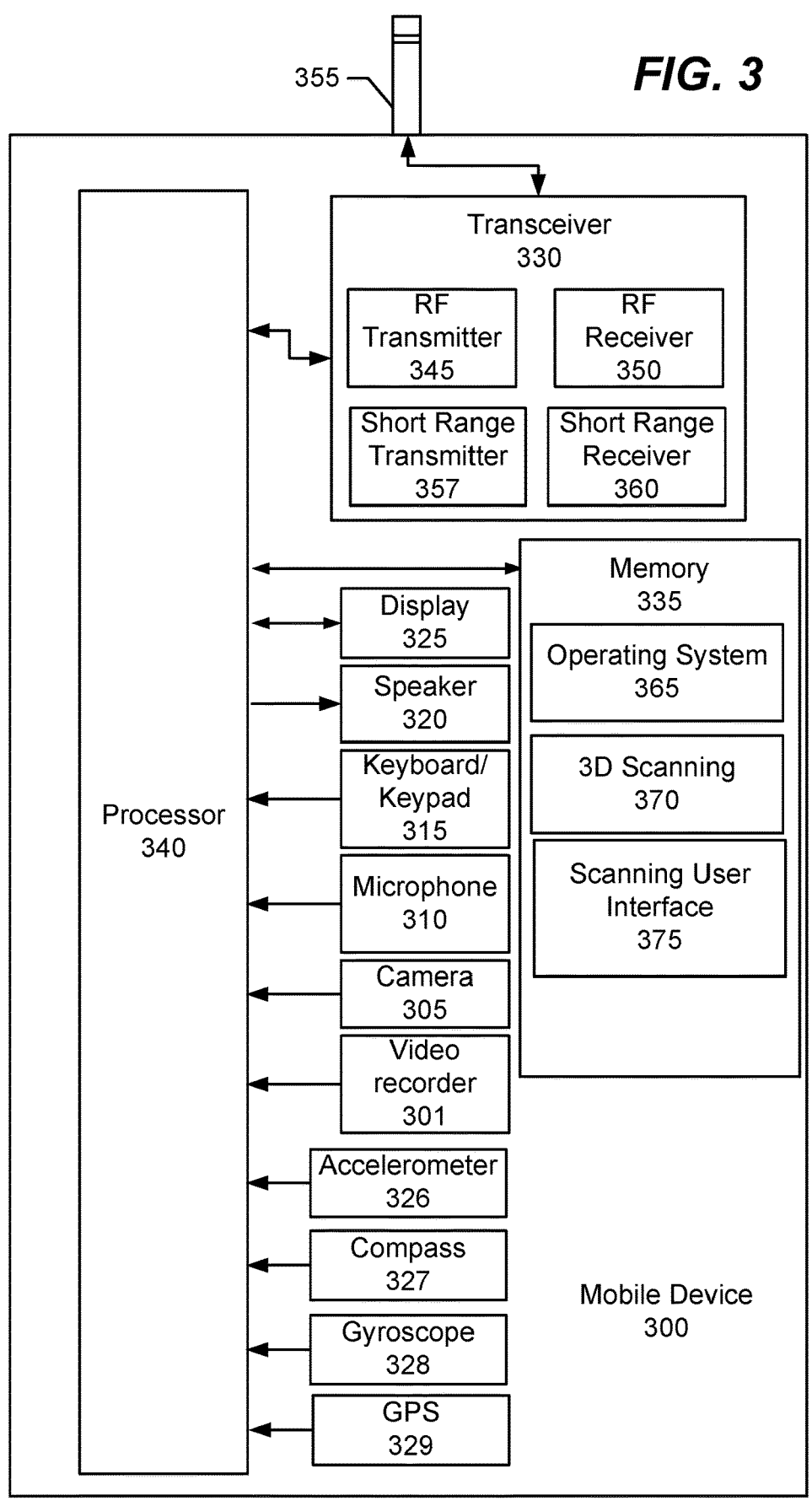
FIG. 3 is a block diagram that illustrates an electronic device/mobile device including a scanning module with a user, interface for guiding a user when performing a 3D scan in accordance with some embodiments of the inventive subject matter.

Referring now to FIG. 3, an exemplary electronic device/mobile device 300 including a scanning module with a user interface for guiding a user when performing a 3D scan, in accordance with some embodiments of the inventive subject matter, includes a video recorder 301, a camera 305, a microphone 310, a keyboard/keypad 315, a speaker 320, a display 325, a transceiver 330 and a memory 335 that communicate with a processor 340. The transceiver 330 comprises a radio frequency transmitter circuit 345 and a radio frequency receiver circuit 350, which respectively transmit outgoing radio frequency signals to base station transceivers and receive incoming radio frequency signals from the base station transceivers via an antenna 355. The radio frequency signals transmitted between the mobile device 300 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The transceiver 330 further comprises a point-to-point short-range wireless transmitter circuit 357 and a point-to-point short-range wireless receiver circuit 360, which respectively transmit and receive short-range wireless signals corresponding to short range wireless technology protocols including, but not limited to, Classic Bluetooth, Bluetooth Low Energy, Wireless Local Area Network (WLAN), ZigBee, Infrared, Device to Device (D2D) cellular, and Wi-Fi. The foregoing components of the mobile device 300 may be included in many conventional mobile devices and their functionality is generally known to those skilled in the art.

The processor 340 communicates with the memory 335 via an address/data bus. The processor 340 may be, for example, a commercially available or custom microprocessor. The memory 335 is representative of the one or more memory devices containing the software and data used to operate the mobile device 300 including facilitating a 3D scan while providing a user with real time guidance by way of a user interface in accordance with some embodiments of the inventive subject matter. The memory 335 may include, but is not limited to, the following types of devices: cache, ROM, PROM, EPROM, EEPROM, flash, SRAM, and DRAM.

As shown in FIG. 3, the memory 335 may contain up to three or more categories of software and/or data: an operating system 365, a 3D scanning module 370, and a scanning user interface module 375.

The operating system 365 generally controls the operation of the mobile device 300. In particular, the operating system 365 may manage the mobile device's software and/or hardware resources and may coordinate execution of programs by the processor 340.

The 3D scanning module 370 may be configured to perform a 3D scan, of an object through cooperation with the camera 305 as described above with respect to FIGS. 1A and 1B. The scanning user interface module 375 may be configured to display the scan operations in real time on the display 325. The scanning user interface module 375 may provide guidance to the user in real time while the user is performing the scan to allow the user to focus the scanning operation on an object or parts of an object that are desired for a 3D reproduction model while avoiding scanning areas that are unwanted or unneeded. In further embodiments, the scanning user interface module 375 may cooperate with the 3D scanning module 370 to provide a real-lime qualitative evaluation of the scanned object that may be used to provide the user feedback with respect to which areas of the scanned object have been scanned sufficiently to render the 3D reproduction model and which areas may benefit from additional scanning data to improve the 3D reproduction model.

Although FIG. 3 illustrates an exemplary software and hardware architecture that may be used for guiding a user when performing a 3D scan in accordance with some embodiments of the inventive subject matter, it will be understood that embodiments of the present invention are not limited to such a configuration, but are intended to encompass any configuration capable of carrying out the operations described herein.

Computer program code for carrying out operations of data processing systems discussed above with respect to FIGS. 1A, 1B, 2, and 3 may be written in a high-level programming language, such as Open CL, Open GL, Python, Java, C, and/or C++, for development convenience. In addition, computer program code for carrying out operations of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

Moreover, the functionality of the electronic device 100 of FIG. 1, data processing system 200 of FIG. 2, and mobile device 300 of FIG. 3 may each be implemented, as a single processor system, a multi-processor system, a multi-core processor system, or even a network of stand-alone, computer systems, in accordance with various embodiments of the inventive subject matter. Each of these processor/computer systems may be referred to as a "processor" or "data processing system." The electronic device 100 of FIG. 1A, data processing system 200 of FIG. 2, and/or mobile device 300 of FIG. 3 may further include a Graphical Processing Unit (GPU) that may be configured to execute the any or all of the program modules described herein in full or in part.

Figure 4:
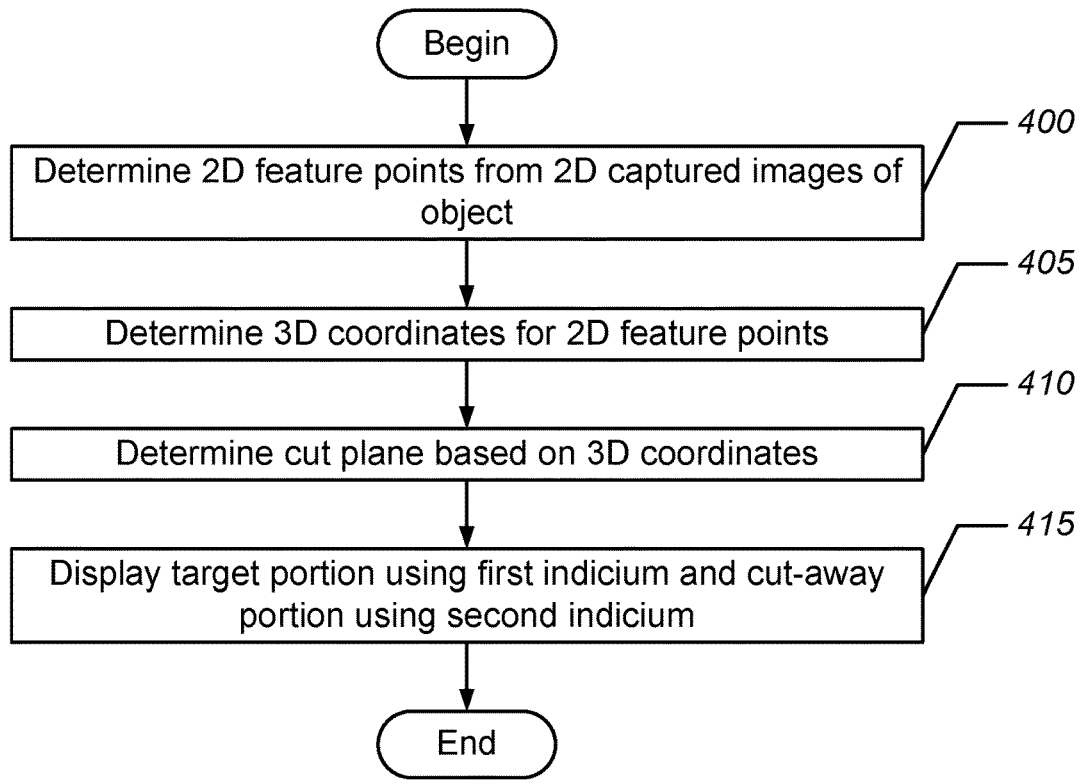
FIG. 4 is a flowchart that illustrates operations for guiding a user when performing a 3D scan in accordance with some embodiments of the inventive subject matter.
Figure 5A:
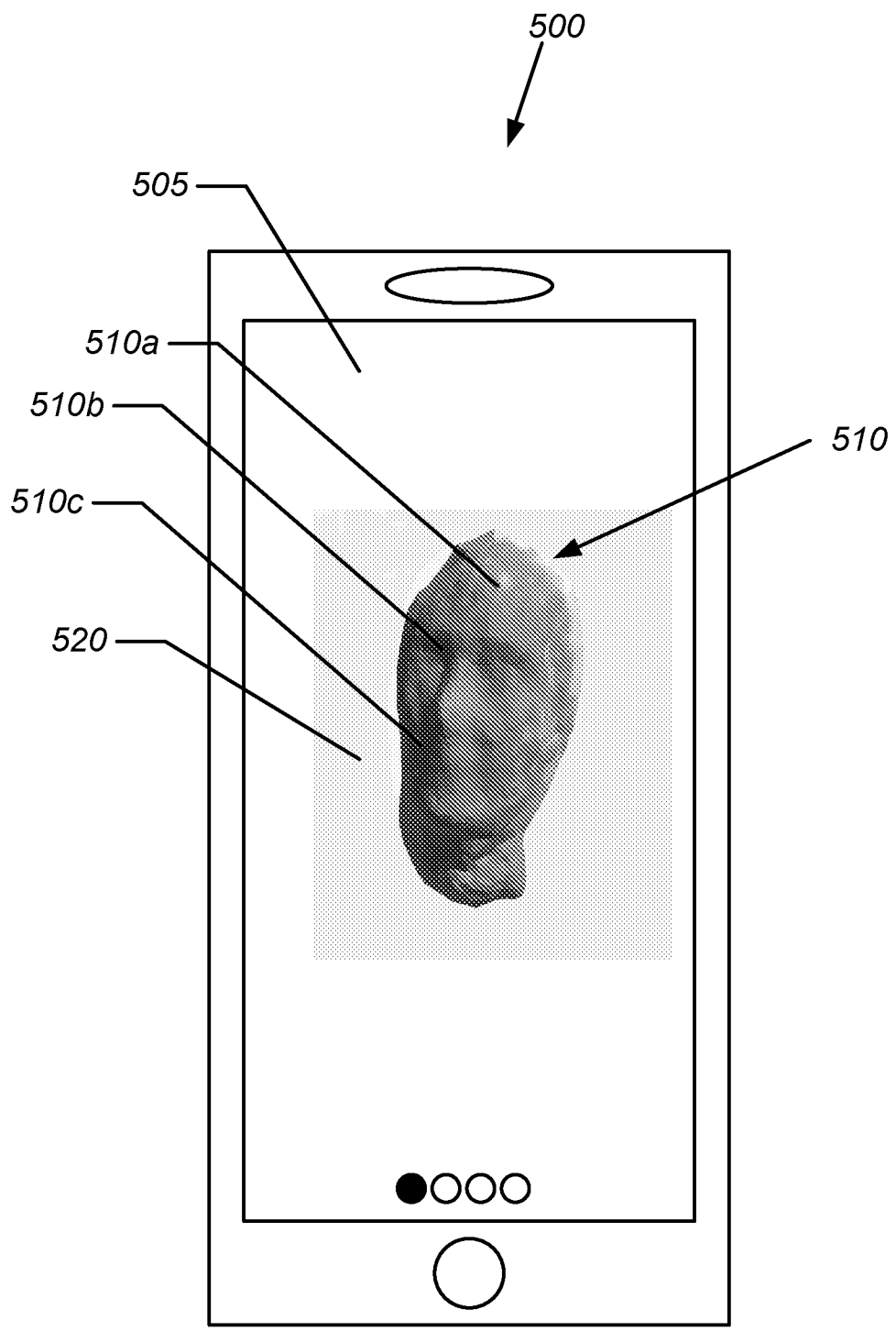
FIGS. 5A, 5B, and 5C are diagrams that illustrate a user interface for performing a scanning operation on the display of the electronic device/mobile device of FIG. 3 in accordance with some embodiments of the inventive subject matter.
Figure 5B:
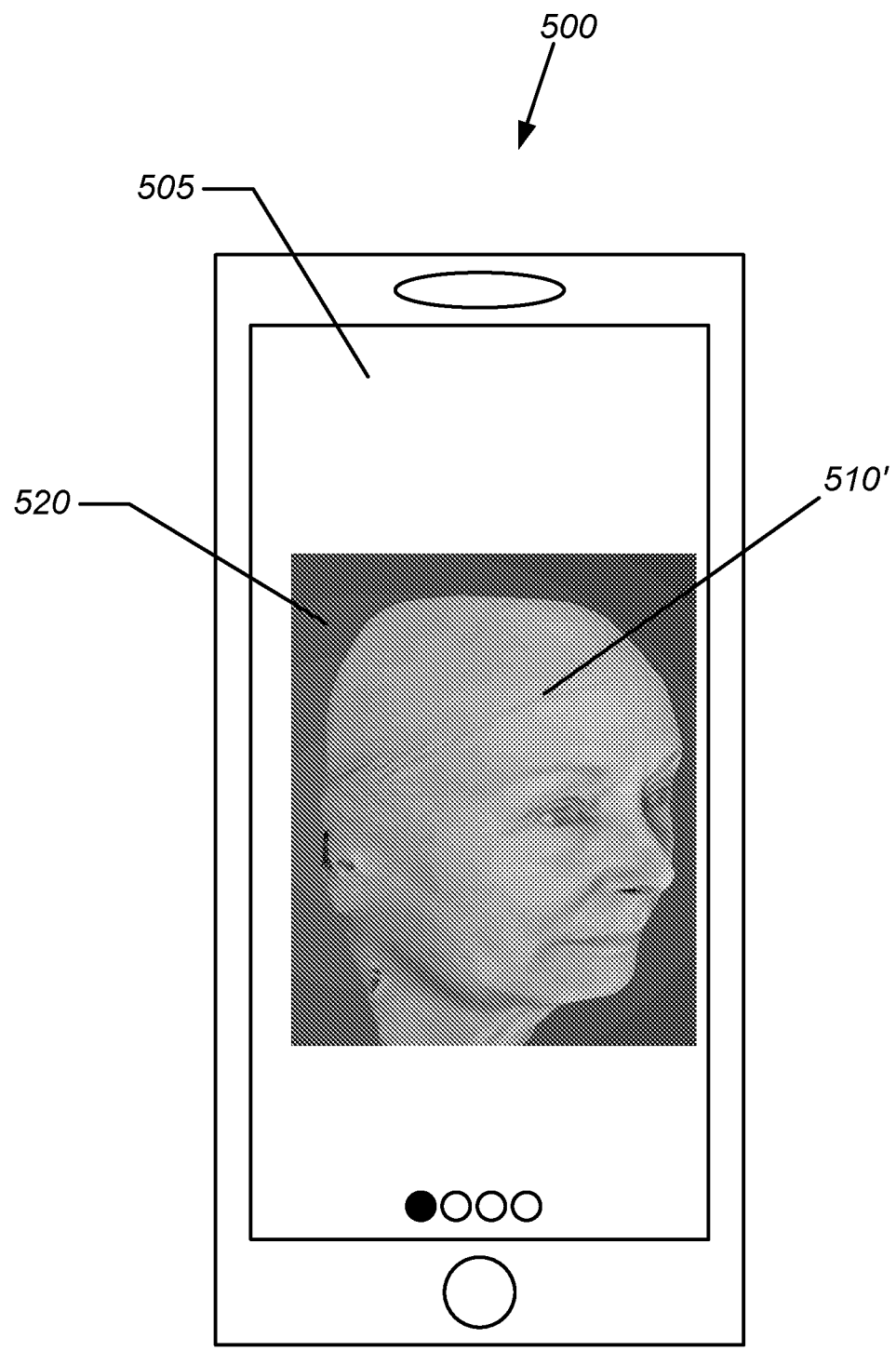
Figure 5C:
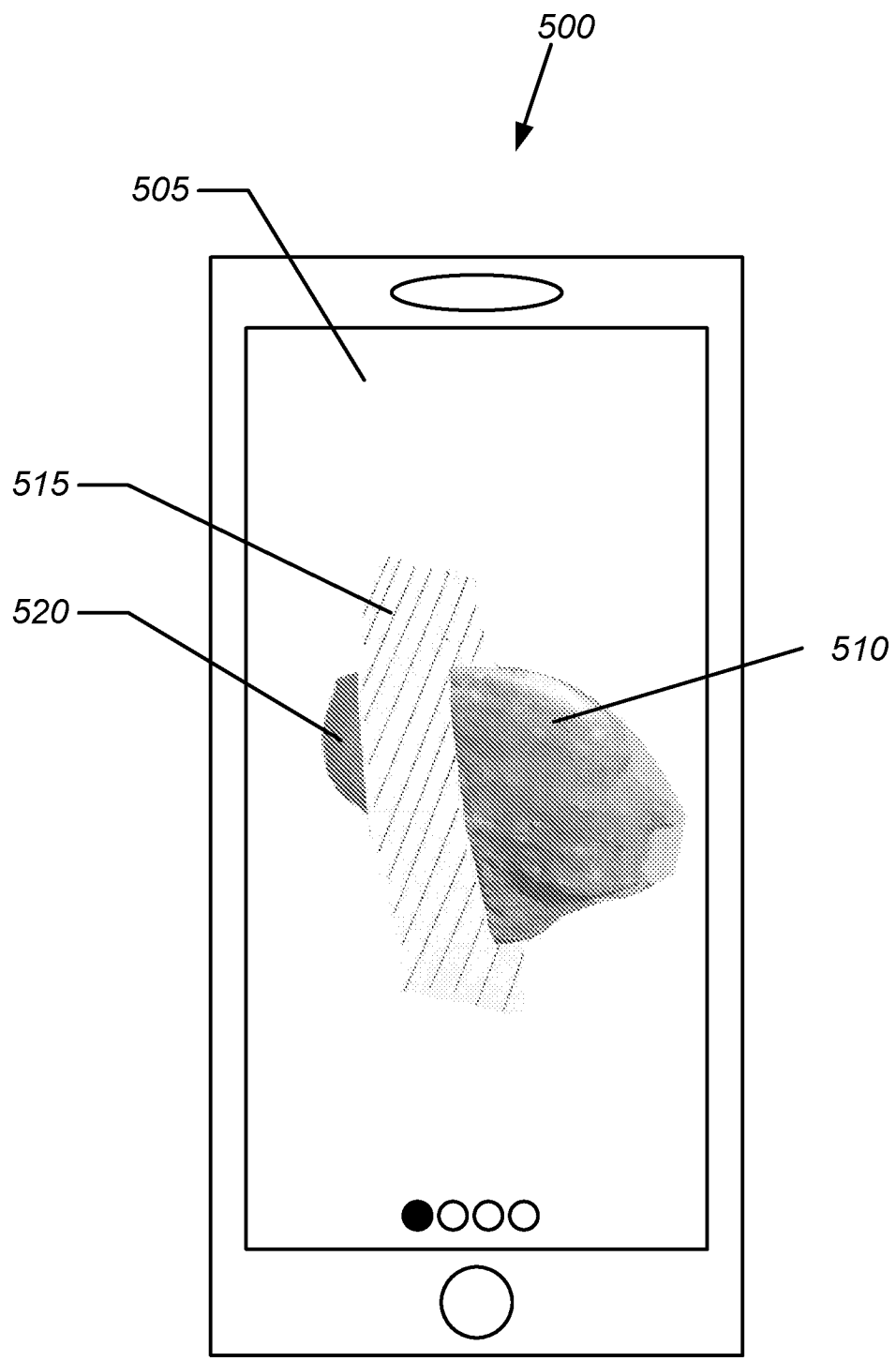

FIG. 4 is a flowchart that illustrates operations for guiding a user when performing a 3D scan in accordance with some embodiments of the inventive subject matter. Referring to FIG. 4, operations begin at block 400 where the 3D scanning module 370 determines two-dimensional (2D) feature points from 2D captured images of an object. The scanning module 370 determines 3D coordinates for the 2D feature points as shown, for example, in FIG. 1B at block 405. The scanning user interface module 375 module in cooperation with the 3D scanning module 370 determines a cut-plane (515 FIG. 5C) based on the three-dimensional coordinates at block 410, which divides the object into a target portion and a cut-away portion. The scanning user interface module 375 may display the target portion of the object on the display 325 at block 415 using a first indicium and the cut-away portion of the object on the display using a second indicium that is different from the first indicium. This is illustrated, for example, in FIGS. 5A, 5B, and 5C. Referring now to FIG. 5A, a mobile device 500 includes a display 505, which has an object that is the subject of a scan displayed thereon. The object includes a target portion 510 and a cut-away portion 520. In the example, the target portion 510 is the face of a person's head and the cut-away portion 520 is the back of the person's head, shoulders, and the environment surrounding the person's head. As shown in FIG. 5A, the scan of the object is at an initial stage as details of the person's face are not shown clearly. FIG. 5B shows the target portion of the object 510', i.e., person's face, after a scan has completed with details of the facial features shown more clearly in the scan. Because only a facial scan was desired, areas corresponding to the bark of the head and the surrounding environment are not scanned as they are unnecessary. FIG. 5C shows the both the target portion of the object 510 along with the cut-away portion of the object 520 along with the cut-plane 515. The display of the cut-plane 515 in real time while the user is performing the scan may provide further assistance to the user distinguishing between the areas that are the target of the scan (target portion 510) and those areas that are extraneous to the scan (cut-away portion 520). The separation of the cut-away portion 520 from the target portion 510 through use of the cut-plane 515 may allow different indicia to be associated with the two different portions of the object. As described above, the indicia may include, but are not limited to, visual indicia, such as color differences, audio indicia, such as an alarm when the user attempts to scan the cut-away portion 520, and touch/feel indicia, such as a vibration of the device 300/500 when the user attempts to scan the cut-away portion. Thus, the user may use the real time guidance provided by the scanning user interface module 375 on the display 325/505 when performing a scan to eliminate the scanning of unneeded or unwanted objects, portions of objects, environmental structures, and the like.

Although FIGS. 5A and 5B illustrate the scanning of an object in which the target portion is the face of a person, it will be understood that embodiments of the inventive subject matter are not limited to a particular division between target portion and cut-away portion of an object. In other embodiments, the cut-plane 515 may be used to divide a person's entire head (i.e., 360 degree scan) from the person's shoulders and body. The cut plane 515 may also be used, for example, to divide an object from a support structure. For example, it may be desired to scan an object sitting on a table without constructing a 3D model of the table with the object. Thus, the cut-plane 515 may be used to separate the object from the table so that only the captured images of the object are processed as part of the 3D model rendering.

Figure 6:
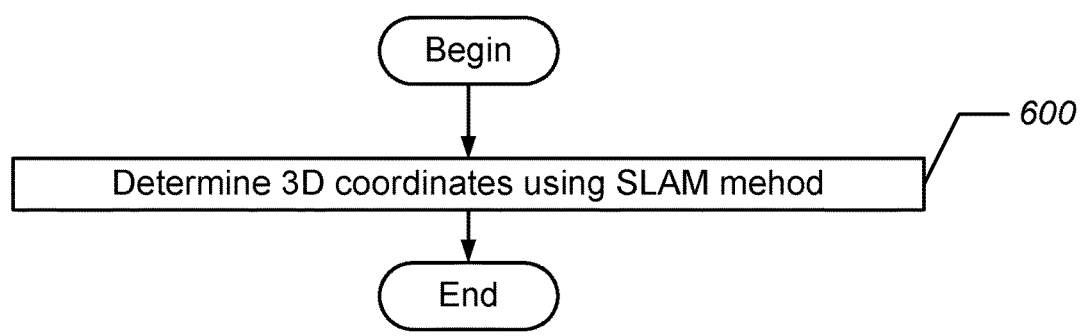
FIGS. 6-9 are flowcharts that illustrate further operations for guiding a user when performing a 3D scan in accordance with some embodiments of the inventive subject matter.

Referring now to FIG. 6, in some embodiments of the inventive subject matter, the operation of block 405 for determining 3D coordinates for the 2D feature points may be performed at block 600 by determining the 3D coordinates using a Simultaneous Localization and Mapping (SLAM) method. SLAM relates to constructing or updating a map of an unknown environment while simultaneously keeping track of an object's location within it. This computational problem is recognized to be chicken-and-egg problem inasmuch as the object, may be moving and the environment may be changing. 2D images of real objects may be captured with the objective of creating a 3D image that is used in real-world applications, such as augmented reality, 3D printing, or 3D visualization with different perspectives of the real objects. The 3D objects may be characterized by features that are specific locations on the physical object in the 2D images that are of importance for the 3D representation, such as corners, edges, center points, or object-specific features on a physical object such as a face that may include nose, ears, eyes, mouth, etc. There are several algorithms used for solving this computational problem associated with 3D imaging including using approximations in tractable time for certain environments. Popular approximate solution methods include the particle filter and Extended Kalman Filter (EKF). The particle filter, also known as a Sequential Monte Carlo (SMC) linearizes probabilistic estimates of data points. The Extended Kalman Filter is used in non-linear state estimation in applications including navigation systems, such as Global Positioning Systems (GPS), self-driving cars, unmanned aerial vehicles, autonomous underwater vehicles, planetary rovers, newly emerging domestic robots, medical devices inside the human body, and image processing systems. Image processing systems may perform 3D pose estimation using SLAM techniques by performing a transformation of an object in a 2D image to produce a 3D model.

Figure 7:
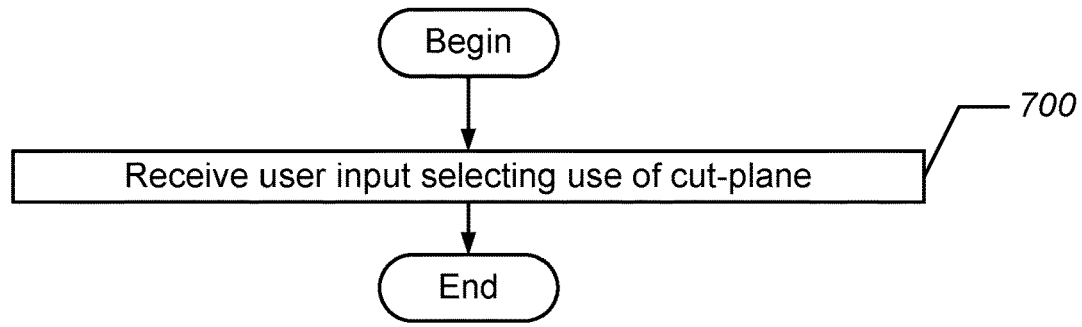

Referring now to FIG. 7, when performing a scanning operation, the scanning user interface module 375 may present the user with an option of whether to operate in an efficiency mode in which a cut-plane 515 is used to guide the user in avoiding unneeded, or unwanted portions of an object or other extraneous structure. Thus, at block 700 the scanning user interface module 375 may receive input from the user selecting use of the cut-plane 515 for performing the 3D scan.

Figure 8:
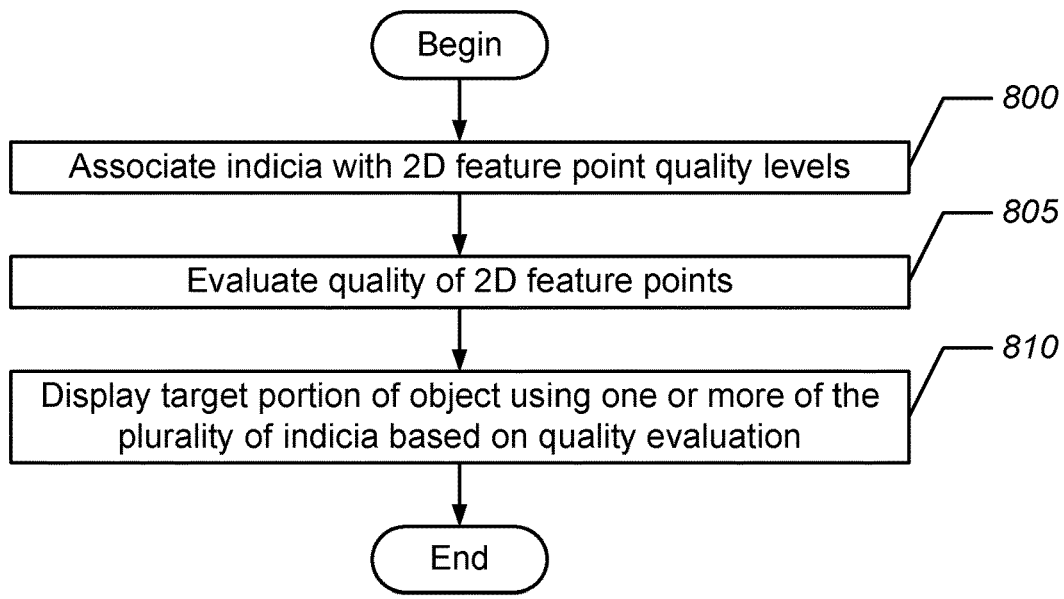

As described above, the scanning user interface module 375 may cooperate with the 3D scanning module 370 to provide a real-time qualitative evaluation of the scanned object that may be used to provide the user feedback with respect to which areas of the scanned object have been scanned sufficiently to render the 3D reproduction model and which areas may benefit from additional scanning data to improve the 3D reproduction model. Referring now to FIG. 8, operations begin at block 800 where a plurality of indicia is associated with a plurality of 2D feature point quality levels. In some embodiments, these indicia may be different colors and/or shades/intensities of colors. The quality of the 2D feature points that were determined from the 2D captured images of the object are evaluated at block 805. The scanning user interface module 375 displays the target portion of the object using one or more of the plurality of indicia associated with the plurality of 2D feature point quality levels at block 810 based on the evaluation performed, at block 805. This is illustrated, for example, in FIG. 5A where the target portion of the object 510 is displayed with area 510a having a lighter shade of color than areas 510b and 510c. This may be indicative to the user that additional scanning time may be needed around the areas 510b and 510c (i.e., the right side of the person's face generally) to collect more 2D feature points relative to what has been collected in area 510a. In general, those areas of a target portion of an object, that includes greater detail, sharper contours, and the like may require more 2D feature points relative to areas of the object that are generally planar with little feature definition.

Figure 9:
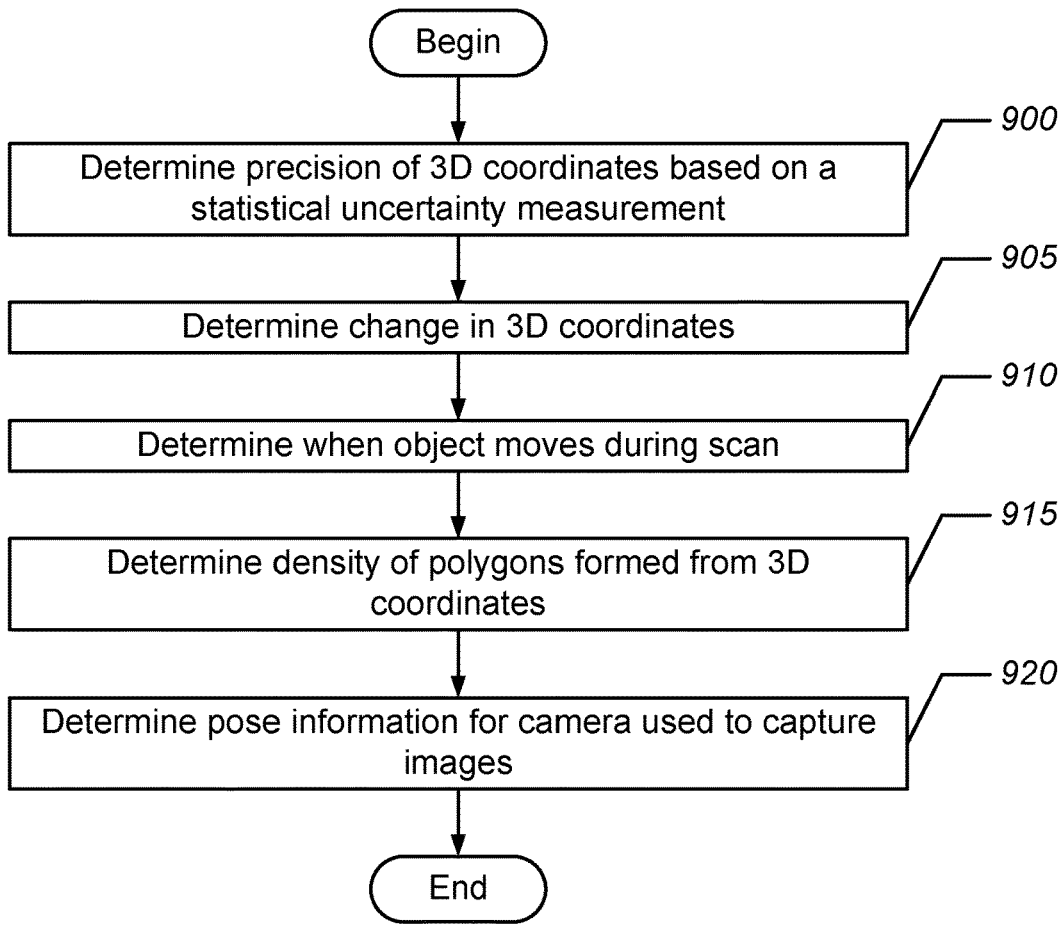

The quality evaluation of the 2D feature points may be performed in a variety of ways in accordance with various embodiments of the inventive subject matter. Referring now to FIG. 9, any one or multiple ones of the operations of blocks 900 through 920 may be performed in any combination in accordance with different embodiments of the inventive subject matter. At block 900, the quality of the 2D feature points may be evaluated by determining a precision of the three-dimensional coordinates based on a statistical uncertainty measurement between previously determined ones of the three-dimensional coordinates and subsequently determined ones of the three-dimensional coordinates. In some embodiments, the statistical uncertainty measurement is a standard deviation determination. At block 905, the quality of the 2D feature points may be evaluated by determining how much the three-dimensional coordinates have changed between previously determined ones of the three-dimensional coordinates and subsequently determined, ones of the three-dimensional coordinates. At block 910, the quality of the 2D feature points may be evaluated by determining when the object moves during performing of the 3D scan. This may assist the user in requesting that the object (e.g., person) sit still or otherwise discouraging or inhibiting movement of the object being scanned. At block 915, the quality of the 2D feature points may be evaluated by determining a density of polygons formed from the 3D coordinates in areas corresponding to at least a subset of the target portion of the object. At block 920, the quality of the 2D feature points may be evaluated by determining pose information for a camera used to capture the two-dimensional images of the object. The pose information comprises both position and orientation information and may be indicative of whether an entire object, for example, has been covered during the scanning process or whether certain areas have received an insufficient amount of focus during the scan.

Thus, embodiments of the inventive subject matter may assist a user in real time when performing a 3D scan by focusing the user on the object, to be scanned or portions of an object to be scanned to avoid scanning additional portions of the object or other extraneous environmental structures, which are unwanted and, therefore, consume processor power and storage capacity when generating the 3D model from the scan. In some embodiments, if the user inadvertently scans additional subject matter that is undesired, the scanning user interface module 375 may provide an editing function to remove such subject matter from the rendering of the 3D model. In some embodiments, the editing may be performed on a preliminary display of the 3D model that includes only a general outline of the scanned object so that the undesired subject matter may be removed before more intensive processing of the 2D feature points is performed.

Embodiments of the inventive subject matter may further provide the user with real time qualitative feedback with respect to the quality of the feature points obtained during the scan of an object. This may inform the user where to focus the scan to obtain additional scanned images as the 2D data acquired thus far is insufficient to generate a 3D model of the desired quality and where the user has already obtained sufficient 2D data from which the 3D model may be generated at the desired quality level.

Further Definitions and Embodiments

In the above-description of various embodiments of the present disclosure, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Open CL, Open GL, Java, Scala, Smalltalk, Eiffel, JADE, Emerald, C++, VB .NET, Python or the like, conventional procedural programming languages, such as the "C" programming language, Visual Basic, Fortran 2003, Perl, COBOL 2002, PEP, ABAP, dynamic programming languages such as Python, Ruby and Groovy, or other programming languages. The program code may execute entirely on the user's computer, partly on the user's computer, as a stand-alone software package, partly on the user's computer and partly on, a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service, such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram, block or blocks.

The flowchart and block diagrams in the figures illustrate the architecture, functionality, and operation of possible implementations of systems, methods, and computer program, products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and, combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items, it will be understood that when an element is referred to as being "connected" or "coupled" to another element or that a connection, such as a communication connection is established between two elements, it may be directly connected or coupled to the other element or intervening elements may be present. A direct coupling or connection between two elements means that no intervening elements are present. Like reference numbers signify like elements throughout the description of the figures.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

That which is claimed:

1. A method of guiding a user when performing a three-dimensional scan of an object, comprising:
    determining two-dimensional feature points from two-dimensional captured images of the object;
    determining three-dimensional coordinates for the two-dimensional feature points;
    determining a cut plane based on the three-dimensional coordinates that divides the object into a target portion and a cut-away portion; and
    displaying the target portion of the object on a display using a first indicium and the cut-away portion of the object on the display using a second indicium that is different from the first indicium,
    wherein the first indicium and the second indicium are audible or touch indicia.

2. The method of claim 1, wherein determining the three-dimensional coordinates for the two-dimensional feature points comprises:
    determining the three-dimensional coordinates for the two-dimensional feature points using a Simultaneous Localization and Mapping (SLAM) method.

3. The method of claim 1, further comprising:
    receiving input from the user selecting use of the cut-plane for the three-dimensional scan.

4. The method of claim 1, wherein the object is a person and the target portion is a face of the person.

5. The method of claim 1, wherein the object is a person and the target portion is an entire head of the person.

6. The method of claim 1, wherein the object comprises a subject and a support structure, the subject being supported by the support structure.

7. The method of claim 1, wherein the first indicium is a first color and the second indicium is a second color that is different from the first color.

8. A method of guiding a user when performing a three-dimensional scan of an object, comprising:
    determining two-dimensional feature points from two-dimensional captured images of the object;
    associating a plurality of indicia with a plurality of two-dimensional feature point quality levels;
    evaluating a quality of the two-dimensional feature points that were determined from the two-dimensional captured images of the object; and displaying the object on the display using one or more of the plurality of indicia associated with the plurality of two-dimensional feature point quality levels based on the quality of the two-dimensional feature points that was evaluated.

9. The method of claim 8, further comprising:
determining three-dimensional coordinates for the two-dimensional feature points;
wherein evaluating the quality of the two-dimensional feature points comprises:
determining a precision of the three-dimensional coordinates based on a statistical uncertainty measurement between previously determined ones of the three-dimensional coordinates and subsequently determined ones of the three-dimensional coordinates.

10. The method of claim 9, wherein the statistical uncertainty measurement is a standard deviation determination.

11. The method of claim 8, further comprising:
determining three-dimensional coordinates for the two-dimensional feature points;
wherein evaluating the quality of the two-dimensional feature points comprises:
determining how much the three-dimensional coordinates have changed between previously determined ones of the three-dimensional coordinates and subsequently determined ones of the three-dimensional coordinates.

12. The method of claim 8, further comprising:
determining three-dimensional coordinates for the two-dimensional feature points;
wherein evaluating the quality of the two-dimensional feature points comprises:
determining when the object moves during performing of the three-dimensional scan.

13. The method of claim 11, further comprising:
determining three-dimensional coordinates for the two-dimensional feature points;
wherein evaluating the quality of the two-dimensional feature points comprises:
determining a density of polygons formed from the three-dimensional coordinates in areas corresponding to at least a portion of the object.

14. The method of claim 11, further comprising:
determining three-dimensional coordinates for the two-dimensional feature points;
wherein evaluating the quality of the two-dimensional feature points comprises:
determining pose information for a camera used to capture the two-dimensional images of the object.

15. A mobile device including a user interface for guiding a user when performing a three-dimensional scan of an object, comprising:
a display;
a processor; and
a computer readable storage medium comprising computer readable program code that when executed by the processor causes the processor to perform operations comprising:
determining two-dimensional feature points from two-dimensional captured images of the object;
associating a plurality of indicia with a plurality of two-dimensional feature point quality levels;
evaluating a quality of the two-dimensional feature points that were determined from the two-dimensional captured images of the object; and
displaying the object on the display using one or more of the plurality of indicia associated with the plurality of two-dimensional feature point quality levels based on the quality of the two-dimensional feature points that was evaluated.

16. The mobile device of claim 15, wherein the operations further comprise:
determining three-dimensional coordinates for the two-dimensional feature points;
wherein evaluating the quality of the two-dimensional feature points comprises:
determining a precision of the three-dimensional coordinates based on a statistical uncertainty measurement between previously determined ones of the three-dimensional coordinates and subsequently determined ones of the three-dimensional coordinates.

17. The mobile device of claim 15, wherein the operations further comprise:
determining three-dimensional coordinates for the two-dimensional feature points;
wherein evaluating the quality of the two-dimensional feature points comprises:
determining how much the three-dimensional coordinates have changed between previously determined ones of the three-dimensional coordinates and subsequently determined ones of the three-dimensional coordinates.

18. The mobile device of claim 15, wherein the operations further comprise:
determining three-dimensional coordinates for the two-dimensional feature points;
wherein evaluating the quality of the two-dimensional feature points comprises:
determining when the object moves during performing of the three-dimensional scan.

19. The mobile device of claim 15, wherein the operations further comprise:
determining three-dimensional coordinates for the two-dimensional feature points;
wherein evaluating the quality of the two-dimensional feature points comprises:
determining a density of polygons formed from the three-dimensional coordinates in areas corresponding to at least a portion of the object.

20. The mobile device of claim 15, further comprising:
a camera;
wherein the operations further comprise:
determining three-dimensional coordinates for the two-dimensional feature points;
wherein evaluating the quality of the two-dimensional feature points comprises:
determining pose information for a camera used to capture the two-dimensional images of the object.

* * * * *